Patented Oct. 10, 1939

2,175,313

UNITED STATES PATENT OFFICE 2,175,313

COMPOSITION AND PROCESS FOR PRODUCING CELLULOSE STRUCTURES

Frank H. Reichel and Augustus E. Craver, Fredericksburg, Va., assignors to Sylvania Industrial Corporation, Fredericksburg, Va., a corporation of Virginia No Drawing. Application June 3, 1936, Serial No. 83,220

8 Claims. (Cl. 18—57)

The invention relates to a process for the production of a cellulosic tubing and to a composition therefor. More particularly, it relates to a process and composition for forming seamless, flexible, non-fibrous tubing capable of use for sausage casings from cellulosic material and includes correlated improvements and discoveries whereby the production of such tubing is enhanced.

Heretofore, it has been considered essential in the preparation of extruded tubing from cellulose esters to employ a solution having the least possible amount of water present, taking care to use only pure organic solvents. It has been necessary to age these cellulose ester solutions for several days before extruding to obtain the necessary degree of ripeness and the elimination of air from the solution which is entrained during the step of dissolving the ester.

An object of the invention is to provide a process and a composition whereby the rate of extrusion of cellulose nitrate solutions in the formation of tubing is increased.

An additional object of the invention is to provide a cellulose nitrate composition which can be extruded without the necessity of first eliminating air present therein.

Another object of the invention is to provide a cellulose nitrate composition which can be rapidly coagulated after extrusion.

A further object of the invention is to provide a cellulose nitrate composition which can be extruded without the necessity of ageing.

A specific object of the invention is to provide an extrusion process in which a low viscosity cellulose nitrate composition is utilized.

Another specific object of the invention is to eliminate the use of pure organic solvents in the preparation of a cellulose nitrate composition for extrusion.

Other objects of the invention will in part be obvious and will in part appear hereinafter.

In accordance with the invention, a composition having novel characteristics is prepared by incorporating in an extruding solution comprising a cellulose nitrate and a water-miscible organic solvent therefor, an appreciable amount of water. The composition comprises, therefore, in general, a cellulose nitrate, a water-miscible volatile organic solvent therefor and at least 6%, based on the total weight of the composition, of water. These compositions are well adapted for forming tubing by an extrusion process in a rapid and continuous manner. The tubing is formed by extruding such a cellulose nitrate composition and coagulating the extruded tubing in an aqueous bath.

A preferred solvent is an alcohol-ether mixture, but other water-miscible organic solvents may be employed, for example, methyl alcohol, acetone, glycol ethers such as monoethyl ether or ethylene glycol (Cellosolve), monobutyl ether of ethylene glycol, etc.

The invention accordingly comprises the improved composition and a process having the steps and the relation of steps, one to another, all as exemplified in the following detailed description and the scope of the invention will be indicated in the claims.

By way of further illustrating the invention, but without thereby limiting it, the following example is presented: There is prepared a collodion solution containing water in an amount slightly below that which would cause separation of cellulose nitrate from the solution. The amount of water added will vary somewhat with the nitrogen content, the viscosity and general solubility of the cellulose nitrate. This solution is then extruded, without ageing, in the form of seamless tubing, the tubing being extruded directly into a coagulating bath consisting essentially of water. Examples of suitable solutions are given as follows:

|  | I | II | III | IV |
|---|---|---|---|---|
|  | Percent | Percent | Percent | Percent |
| Dry cellulose nitrate (containing 12 percent N) | 19 | 19 | 15 | 15 |
| Ethyl alcohol | 41 | 44 | 46 | 38 |
| Ethyl ether | 32 | 31 | 29 | 38 |
| Water | 8 | 6 | 10 | 9 |

In general, when using an alcohol-ether solvent mixture, the water may vary from about 6% to about 11%, but in the preferred embodiment of the invention the water represents from about 6% to about 9% by weight of the total composition including the solvents. When the amount of water is less than about 11%, it appears that the water dissolves in the alcohol-ether mixture and does not cause separation of the cellulose nitrate from the composition before extrusion.

The coagulating bath may comprise any suitable aqueous solution containing a small amount of a water-miscible cellulose nitrate solvent. Suitable coagulating baths may comprise for example:

|  | I | II | III |
|---|---|---|---|
|  | Percent | Percent | Percent |
| Water | 85 | 71 | 80 |
| Ethyl alcohol | 13 | 25 | 17 |
| Ether | 2 | 4 | 3 |

The water in the bath, together with the water in the solution being extruded, brings about a rapid coagulation of the cellulose nitrate.

The cellulose nitrate compositions given in Examples I, II and III, when extruded into the coagulating baths of Examples I, II and III, will give products which are clear and transparent, whereas the cellulose nitrate composition of Example IV, when extruded into these baths, will give a product which has a decorative translucency and silky lustre. By varying the composition of the coagulating bath, one may produce with a given cellulose nitrate composition of the invention either a transparent or a translucent product. Generally speaking, to obtain a translucent or opaque product from a given composition, the ratio of water to water-miscible, organic solvent in the coagulating bath is increased, thereby increasing the rate of coagulation which brings about the desired translucency or opacity. On the other hand, with the cellulose nitrate composition of Example IV, a transparent product may be obtained by increasing the quantity of alcohol in the coagulating bath. The concentration of the bath may be kept constant by supplying water thereto at an appropriate rate to balance the solvents absorbed. After coagulation, the tubing may be washed, denitrated, softened and otherwise finished as desired.

The water in the cellulose nitrate solution may be provided by using an alcohol containing a definite, known percentage of water, and/or ether containing a definite, known percentage of water, or a definite, known solution of ether, alcohol and water.

A considerable saving in the cost of solvents results in that the use of expensive anhydrous solvents is dispensed with and the less costly grades (solvents containing water) employed. However, it is essential that the water content of the solvents used be known as the percentage of water present in the extruding composition is a critical factor in the process.

In the preparation of extruding solutions, the cellulose ester and organic solvent are usually subjected to agitation to accelerate or promote the action of the solvent. During the step of agitation, air bubbles are formed in the solution, thus rendering it necessary to age the solution in order to permit the air to escape from the solution before extrusion. The addition of water to the extruding solution prevents or removes the air bubbles which are usually formed and thereby renders it unnecessary to age the solution as hitherto required. This feature enables the process to be speeded up as the composition so produced may be used immediately after preparation. Ageing tanks are dispensed with, thus saving the cost of such equipment and also the accompanying labor costs involved in transferring the solutions from the mixing apparatus to the ageing tanks.

The rate of coagulation being increased due to the presence of water permits the use of a composition having a lower viscosity than hitherto employed for extruding tubing. This is quite advantageous as it facilitates handling, filtration and extrusion of the composition.

The presence of the water in the extruding compositions cooperates with several inter-related factors to increase the rate of extrusion. The prime factor lies in the step of coagulation. Coagulation is brought about by the diffusion of the coagulating agent (water) into the walls of the extruded product, thereby diluting the solvent and causing the cellulose nitrate to separate out as a self-sustaining gel. Further, the coagulation of the composition must take place immediately upon leaving the extrusion head so that the extruded product will maintain its original form. The rate of coagulation of a solution consisting of a cellulose nitrate and an organic solvent is relatively slow due to the slow rate of diffusion of water into such a solution. In the present process, the rate of coagulation of the solution is increased materially because the diffusion of only a very small amount of water into the solution is necessary to cause coagulation. Since the rate of extrusion is dependent primarily upon the rate of coagulation, it is clear that the extrusion rate is increased considerably by the present process. Such a rapid rate of coagulation permits the use of a solution having a lower viscosity than heretofore, and this further aids in increasing the rate of extrusion.

The products of the present process have the same strength as products made from similar compositions not containing water.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process of forming tubing which comprises extruding a cellulose nitrate composition containing from about 6% to about 11% by weight of water in the form of a tube, and coagulating said composition in an aqueous bath.

2. A process of forming a shaped body which comprises extruding a cellulose nitrate composition containing a water miscible organic solvent and from about 6% to about 11% by weight of water, and coagulating said composition in an aqueous bath.

3. A process of forming tubing for use as a sausage casing and the like which comprises extruding a cellulose nitrate composition containing water in an amount of at least 6% by weight of the composition and not more than that amount of water which is just insufficient to precipitate said cellulose nitrate from the composition, in the form of a tube, and coagulating the composition in an aqueous bath.

4. A process of forming tubing for use as a sausage casing and the like which comprises extruding a composition comprising by weight a cellulose nitrate about 19% on the dry basis, alcohol 41%-44%, ether 31%-32% and water 6%-8%, in the form of a tube, and coagulating said composition in a bath containing water, alcohol and ether.

5. A composition of matter adapted to be formed into a tubing by extrusion and coagulation comprising a cellulose nitrate, a water-miscible solvent therefor and water, the water being present in an amount of at least 6% and not more than that which is just below that which will cause separation of the cellulose nitrate from the solution.

6. A composition of matter adapted to be formed into tubing by extrusion and coagulation comprising a cellulose nitrate, a water-miscible solvent therefor, and about 6%-11% by weight of water.

7. A composition of matter adapted to be formed into tubing by extrusion and coagulation comprising a cellulose nitrate, alcohol, ether and at least 6% by weight of water, and not more than that amount of water which is just insufficient to precipitate said cellulose nitrate.

8. A composition of matter adapted to be formed into tubing by extrusion and coagulation comprising by weight cellulose nitrate about 19%, alcohol 41%-44%, ether 31%-32% and water 6%-8%.

FRANK H. REICHEL.
AUGUSTUS E. CRAVER.